Feb. 11, 1958 R. W. JOHNSON ET AL 2,822,985
THERMOSTATIC CONTROL
Filed Jan. 19, 1955
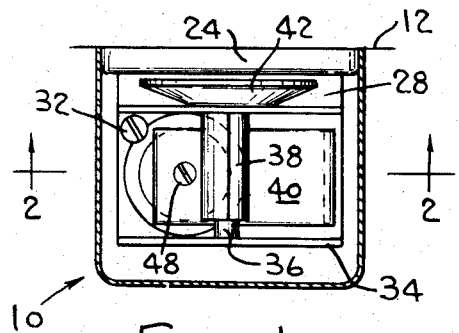
FIG. 1
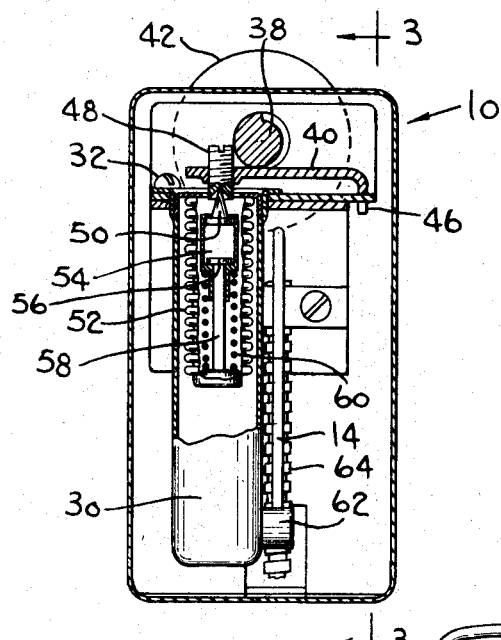
FIG. 2
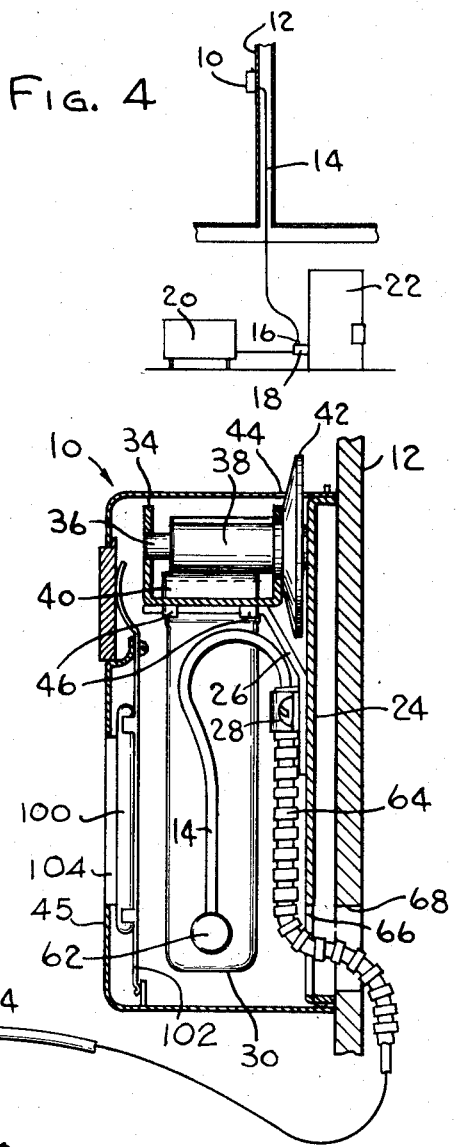
FIG. 4
FIG. 3
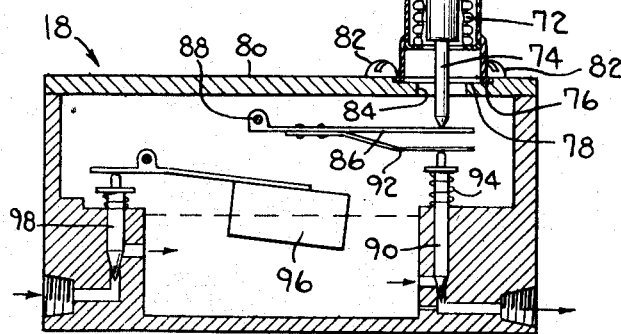
*INVENTOR.*
ROY W. JOHNSON
WILLIAM A. BIERMANN
BY
John W. Michael
ATTORNEY

United States Patent Office 2,822,985
Patented Feb. 11, 1958

2,822,985

THERMOSTATIC CONTROL

Roy W. Johnson and William A. Biermann, Milwaukee, Wis., assignors, by mesne assignments, to Controls Company of America, Schiller Park, Ill., a corporation of Delaware Application January 19, 1955, Serial No. 482,766

4 Claims. (Cl. 236—99)

This invention relates to a mechanical thermostat which may be installed at a location remote from the controlled device and may be run through walls and the like to provide a neat installation. The thermostat is particularly adapted to operate a control valve supplying a burner and when used in connection therewith, permits a neat, remote installation having the desirable features of an electric thermostat installation without requiring electric power. Therefore, the present device is well suited for use on boats, trailers and the like as well as residences.

The principal object of this invention is to provide a simple, remote thermostat of the mechanical type.

Another object is to provide a mechanical thermostat which can be installed as neatly as electrical thermostats.

Other objects and advantages will be pointed out in, or be apparent from, the specification and claims, as will obvious modifications of the single embodiment shown in the drawings in which:

Fig. 1 is a top plan view with the cover broken away to show the interior of the room thermostat unit;

Fig. 2 is a section taken on line 2—2 in Fig. 1;

Fig. 3 is a section on line 3—3 in Fig. 2 and additionally shows the operator unit mounted on a schematic constant level oil control valve; and Fig. 4 is a schematic representation of a heating installation using the present thermostat with the operator and capillary tube run through a wall.

Referring to the drawings in detail, an example of one type of installation for which the present device is suited is shown in Fig. 4 wherein thermostat 10 is mounted on wall 12 and capillary tube 14 is passed into the wall and down between the studs and through the floor into the basement where it terminates in power element 16 mounted on constant level oil control valve 18 which regulates oil flow from supply tank 20 to heater 22. Power element 16 has a small external diameter (about ¾ inch) and may be easily pulled through a wall and since capillary tube 14 is flexible it presents no obstacle to passage through the wall. As a result, the present unit can be installed at a remote location in much the same manner as an electrical unit wherein the wires from the thermostat would be run through the walls. It will be appreciated, of course, that the present unit can also be installed on trailers, boats and other installations. In any such installation the power element and capillary tube can be passed through wall, floors, etc. to conceal the line between the thermostat and the heater.

Room thermostat 10 includes base plate 24 which is adapted to be mounted on wall 12. Bracket 26 is secured to base plate 24 by screw 28 and projects forwardly and upwardly from the base plate to support thin walled heat sensing element 30. The periphery of element 30 is secured on bracket 24 by means of screw 32, which also holds the U-shaped shaft-supporting bracket 34 on the bracket 26. Shaft 36 is journaled in the U-shaped bracket 34 and includes cam 38 which is adapted to adjust the position of lever 40 as the cam is rotated by means of hand wheel 42. It will be noted that the hand wheel projects through slot 44 in the top of the casing for access. The hand wheel can bear any suitable indicia to aid in selecting the desired temperature to be maintained by the heater.

It will be noted that cam 38 acts on lever 40 which is fulcrumed at its right-hand end where lugs 46, 46 depend through cooperating apertures in the U-shaped bracket 34. The lever is provided with an adjusting screw 48 which has a socket receiving the pointed end 50 of the push pin interconnecting the bellows 52 and the cam. The pointed end is fixed within cylindrical member 54 which receives the head 56 of pin 58. The bottom of pin 58 bears against the end of bellows 52 and compressed spring 60 urges pin 58 away from cylinder 54 to the position shown in Fig. 2. The force of spring 60 exceeds the normal forces encountered in the system and, therefore, for all practical purposes, the bellows is connected to the adjusting screw 48 by a solid push pin. However, should unusually high temperatures be encountered which might otherwise damage the system, the bellows can collapse by moving pin 58 upwardly with respect to cylinder 54. Thus, the push pin has an overtravel type of safety mechanism to prevent damage to the bellows.

It will be appreciated that as the hand wheel is rotated about shaft 36, the cam 38 will act on the bellows through the medium of lever 40 and set screw 48 to vary the volume within the temperature sensing element 30. The temperature sensing element 30 has a connecting manifold 62 to which capillary tube 14 is connected. The capillary tube is run up alongside sensing element 30 and is then passed through the flexible armor 64 which is clamped to the base plate by screw 28. The armor and the tube 14 pass out through the base plate aperture 66 and enter the wall 12 through the aperture 68 cut for this purpose when mounting the thermostat. The hole in wall 68 can be as small as ¾ inch and still permit the power element 16 to pass into the wall.

As can be seen in Fig. 3, the power element consists simply of a generally cylindrical casing 70 having an interior bellows 72 hermetically sealed with respect thereto. Bellows 72 is provided with push pin 74 which is adapted to act on a valve mechanism. It is to be noted that the generally cylindrical casing 70 of the power element is provided with a small peripheral flange 76. The constant level valve upon which the power element is to be mounted is provided with an aperture of such size as to snugly receive peripheral flange 76 while providing a ledge underneath the flange to support the power element. Thus, in Fig. 3 the flange 76 is supported on ledge 78 while the flange 76 is held on the top 80 of the constant level valve 18 by means of a number of screws 82 threaded into top 80 so that the heads of the screws overlie the peripheral flange to accurately position the power element. It will be noted that push pin 74 depends through the aperture 84 to act on lever 86 pivoted at 88. Movement of the lever 86 is transmitted to valve 90 through leaf spring 92 (which takes up overtravel).

As the temperature at sensing element 30 increases, the solid charge within the element, tube and the operator will expand and the only point available for accommodating this expansion is bellows 72 in the power element. Thus, the bellows 72 will move downwardly to move the push pin 74 downwardly to close the outlet valve 90 in opposition to spring 94. As the sensing element cools, bellows 72 will move upwardly and valve 90 will open under the influence of spring 94. The level in the valve casing is regulated by float 96 acting on inlet valve 98 to maintain a constant level.

The snap-on type cover 45 may be provided with thermometer 100 carried on bracket 102 and visible through slot 104 in the front of the cover plate. Of course, the top and the bottom of the cover plate are suitably apertured to allow free circulation of air through the unit so as to obtain a true indication of ambient temperature.

The success of this device resides in making the power element of extremely small size while the sensing element is made with an adjustable volume so as to vary the operating characteristics at the power element. In addition, providing the base plate with an aperture so as to permit concealing the capillary in the wall results in providing an extremely versatile unit which, when installed, is to all outward appearances the same as an electric thermostat.

Although but one embodiment of the present invention has been illustrated and described, it will be apparent to those skilled in the art that various changes and modifications may be made therein without departing from the spirit of the invention or from the scope of the appended claims.

We claim:

1. A mechanical thermostat comprising a base plate adapted to be mounted on a wall, a temperature sensing element mounted on the base plate and including a rigid shell having a flexible bellows mounted therein to define therewith a variable volume chamber, the chamber being charged to vary the pressure in the chamber with temperature variations, the inside of the bellows being exposed to atmospheric pressure, a shaft rotatably mounted on the base, a cam on the shaft, means for rotating the shaft and cam, a push pin having one end engageable with the bellows, adjustable means between the other end of the push pin and the cam for transmitting motion from the cam to the pin and to permit adjustment of the motion, a pressure responsive power element adapted to actuate a valve, and capillary tubing connecting the chamber to the element to transmit pressure variations within the chamber to the element, said adjustable means comprising a lever fulcrumed on the base, the cam acting on the lever, and an adjusting screw mounted on the lever and receiving said other end of the pin.

2. A mechanical thermostat according to claim 1 in which the pin includes two telescopic parts and a spring biasing the parts to a position in which the parts act as a solid pin but yieldable upon overloading to permit the parts to telescope and prevent damage to the bellows.

3. A mechanical thermostat according to claim 2 in which the power element includes a rigid casing having a bellows therein cooperating therewith to define a chamber communicating with the first chamber through the capillary tubing, and a push pin connected to the last named bellows and adapted to act on a valve.

4. A mechanical thermostat according to claim 3 in which the base plate is apertured and the capillary tubing passes through the aperture, the power element being of small size to permit passing it through a wall back of the base plate.

References Cited in the file of this patent

UNITED STATES PATENTS

| | | |
|---|---|---|
| 1,234,573 | Sandvoss | July 24, 1917 |
| 1,925,530 | Gotthardt | Sept. 5, 1933 |
| 1,948,659 | Giesler | Feb. 27, 1934 |
| 1,952,683 | Resek | Mar. 27, 1934 |
| 2,019,962 | Giesler | Nov. 5, 1935 |
| 2,171,272 | Kronmiller et al. | Aug. 29, 1939 |

U. S. DEPARTMENT OF COMMERCE
PATENT OFFICE
CERTIFICATE OF CORRECTION

Patent No. 2,822,985                February 11, 1958

Roy W. Johnson et al.

It is hereby certified that error appears in the printed specification of the above numbered patent requiring correction and that the said Letters Patent should read as corrected below.

Column 4, line 8, for "on the lever and" read -- in the lever and --.

Signed and sealed this 29th day of April 1958.

(SEAL)
Attest:
KARL H. AXLINE
Attesting Officer

ROBERT C. WATSON
Commissioner of Patents